United States Patent
Kurek, III et al.

Patent Number: 5,956,821
Date of Patent: Sep. 28, 1999

[54] ONE-PIECE CATCH

[75] Inventors: Edward Kurek, III, Birdsboro, Pa.; Richard E. Schlack, Rising Sun, Md.

[73] Assignee: Southco, Inc., Concordville, Pa.

[21] Appl. No.: 08/987,566

[22] Filed: Dec. 11, 1997

[51] Int. Cl.[6] .................................................. E05F 17/02
[52] U.S. Cl. ............................... 24/458; 24/295; 24/297; 292/128
[58] Field of Search ............................. 24/293–295, 297, 24/326, 458; 16/82, 85; 292/128, 102, 241, 242, 228

[56] References Cited

PUBLICATIONS

Southec, Inc. brochure, page 2, "Dovetail Base", undated.
Southco Latches and Access Hardware, North American Edition–47NA, pp. B4–B8, G3, G5, G10–G11, G26, K2–K4, undated.

*Primary Examiner*—James R. Brittain
*Attorney, Agent, or Firm*—Paul & Paul

[57] ABSTRACT

A one-piece catch for installation on a panel having a front side and a rear side, for holding a folding handle in a folded position to the front side of the panel, or an other article in place, including a panel attachment means for installing the one-piece catch on the panel by inserting the one-piece catch through the panel and rotating the catch ninety degrees to seat the catch in position, and a releasable pawl formed integral to the panel attachment means having a head section with a camming surface adapted to contact the handle as the handle is folded to the folded position, the handle moving the pawl back to force the pawl away from the handle as the handle is latched to the one-piece catch, the pawl springing forward as the handle passes over the camming surface to seat the handle under the pawl, the handle releasable from the pawl by the application of pressure to the pawl away from the handle.

19 Claims, 4 Drawing Sheets

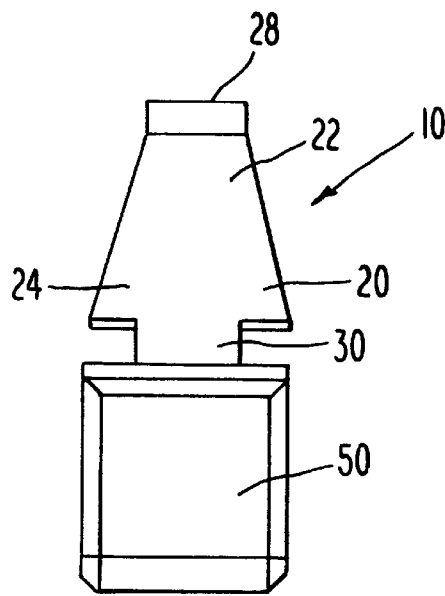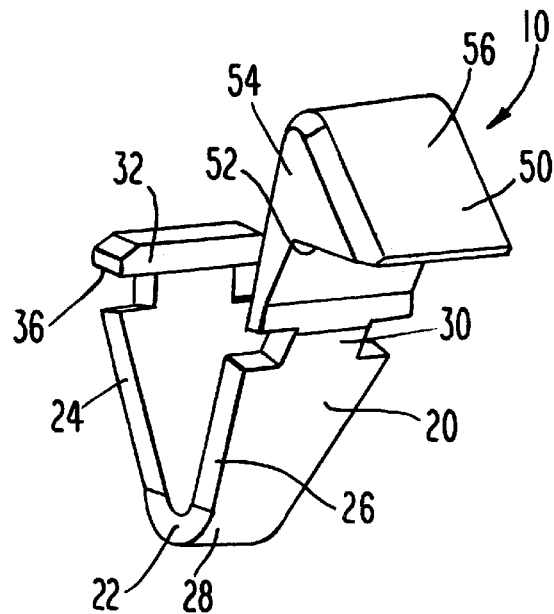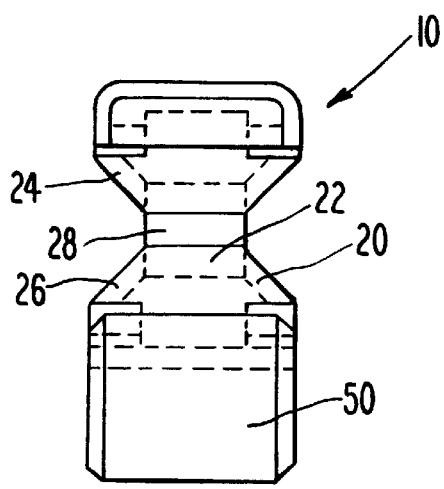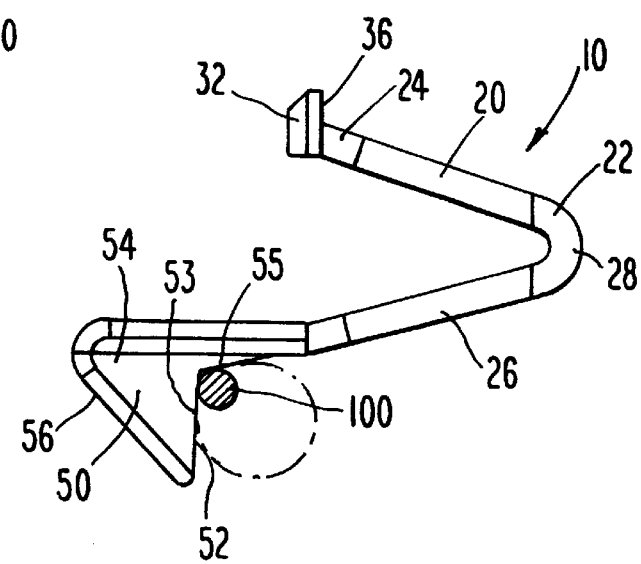

ONE-PIECE CATCH

BACKGROUND OF THE INVENTION

This invention relates generally to latching devices and more particularly to a catch for securing a folding handle in a folded position or other article in position.

Various handles are known in which a U-shaped handle which is rigidly held to a panel or other similar structure at the base of the handle. Additionally various U-shaped handles are known which pivot from an upright position, where the handle can easily be grasped to pull or lift an object to which the handle is attached, to a folded position, where the handle is folded away such that the handle is no longer protruding outwardly. This is advantageous in numerous circumstances where extra space is desired or where the protruding handle would otherwise cause an obstruction to objects nearby.

Various catches are also known, but none provides all the benefits of the present invention, as described below.

SUMMARY OF THE INVENTION

The present invention provides a one-piece catch for releasably retaining a foldable handle mounted to a panel in a folded position on the panel or for holding any other article to a panel. The one-piece catch mounts on the panel on which the handle is mounted by inserting a panel attachment means on the catch through a surface of the panel and rotating the one-piece catch ninety degrees until it seats in position on the panel. The one-piece catch of the present invention may also serve to hold a other articles or panels, such as a printed circuit board assembly, in place on a housing by latching the panel down by its handles or its edges and thus preventing its removal from the housing.

The one-piece catch of the present invention is for installation on a panel having a front side and a rear side for holding a folding handle in a folded position to the front side of the panel, or another article in place. The catch includes a panel attachment means for installing the one-piece catch on the panel by inserting the one-piece catch through the front surface of the panel and rotating the catch ninety degrees to seat the catch in position, and a releasable pawl formed integral to the panel attachment means. The pawl has a head section with a camming surface adapted to contact the handle (or other article) as the handle is folded to the folded position, the handle moving the pawl back to force the pawl away from the handle as the handle is latched to the one-piece catch. The pawl springs forward as the handle passes over the camming surface to seat the handle under the pawl. The handle is releasable from the pawl by the application of pressure to the pawl away from the handle. A second embodiment of the one-piece catch of the present invention installs from the rear of the panel.

It is therefore an object of the present invention to provide a one-piece catch to secure a folding handle in a folded position, or other article in place, molded as a single unit from a suitable grade of resilient, synthetic material.

It is another object of the present invention to provide a one-piece catch to secure a folding handle in a folded position, or other article in place, that is adapted to be inserted from the same side of the panel to which the handle or article is located.

It is an object of an alternate embodiment of the present invention to provide a one-piece catch to secure a folding handle, or other article in place, that is adapted to be inserted on the opposite side of the panel to which the handle or article is located.

It is another object of the present invention to provide a one-piece catch to secure a folding handle in a folded position, or other article in place, that is adapted to be installed on a thin panel.

It is still another object of the present invention to provide a one-piece catch to secure a folding handle in a folded position, or other article in place, that is adapted to be inserted into a thin panel by twist-in installation.

It is still another object of the present invention to provide a one-piece catch to secure a folding handle in a folded position, or other article in place, where the pawl portion of the one-piece catch hooks over a handle or article of various cross sections and cross-sectional diameters to hold the handle or article in place.

It is a still further object of the present invention to provide a one-piece catch to secure a folding handle in a folded position, or other article in place, that allows handle or article to be slammed shut, but must be disengaged by pressure on the one-piece catch to release the handle or article.

It is a further object of the present invention to provide a one-piece catch to secure a folding handle in a folded position, or other article in place, that allows handle or article to be slammed shut, but must be disengaged by pressure on the one-piece catch to release the handle or article that provides a hold down retention of significant force, for example of 100 pounds or more, in the vertical direction to provide a hold down point.

It is a another object of the present invention to provide a one-piece catch to secure a folding handle in a folded position, or other article in place, that provides minimal space requirements on the front side of the panel with larger space requirements on the rear side of the panel.

Other objects and advantages of the present invention will become apparent from the following description taken in conjunction with the accompanying drawings.

BRIEF DESCRIPTION OF THE DRAWINGS

FIG. 1 is a perspective view of a one-piece catch in accordance with a first embodiment of the present invention.

FIG. 2 is a side view of the one-piece catch of FIG. 1 showing the cross-section of a handle and the outline of the cross-section of a large diameter handle in phantom lines.

FIG. 3 is a top view of the one-piece catch of FIG. 1.

FIG. 4 is a front view of the one-piece catch of FIG. 1.

DESCRIPTION OF THE PREFERRED EMBODIMENT

Figure 5:
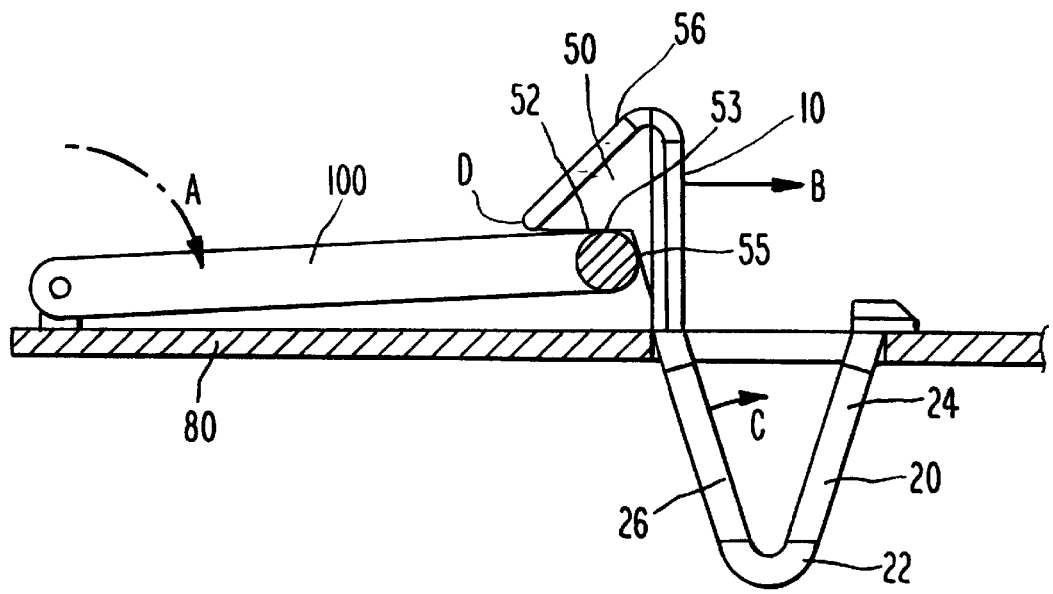
FIG. 5 a side view of the one-piece catch of FIG. 1 depicted as mounted on a partially cut away panel on which a cutaway U-shaped handle is mounted.

Referring now in detail to the drawings, wherein like reference numerals indicate like elements throughout the several views, there is shown in FIGS. 1 through 4, a one-piece catch 10 in accordance with one preferred embodiment of the present invention. The illustrative one-piece catch 10 is shown generally comprising a panel attachment means 20 and a releasable pawl 50.

The panel attachment means 20 is preferably a generally V-shaped (which includes U-shaped) member 22 made of a resilient material such as a polymeric material. The V-shaped member 22 has a first arm 24 and a second arm 26 extending from a point where both arms meet 28. Since the material is a resilient material, preferably a polymeric material, the second arm 26 of the V-shaped member 22 is capable of being compressed towards the first arm 24 of the V-shaped member 22.

As depicted in FIGS. 1 and 4, when looking at the V-shaped member 22 from the front side, the arms of the V-shaped member 22 are each notched out providing a straight sided neck 30 on each arm 24, 26. The first arm 24 has an integral cap section 32 which again preferably extends to the width of the V-shaped member 22 below the notched out section having the neck 30. The second arm 26 of the V-shaped member 22 includes an integral releasable pawl 50 as will be discussed in detail below.

The one-piece catch 10 is attached to a panel 80 as follows. As seen in FIG. 7, a generally rectangular hole 82 having two parallel sides 84, 86 which are curved out or widened at their central sections is made in the panel 80 on to which the one-piece catch 10 is attached. As will be described in detail below, the hole 82 is fabricated at a position on the panel 80 in spaced relation to a handle 100 (see FIGS. 5 and 6), or other article, such that the handle 100 is held securely.

The one-piece catch 10 is inserted into the hole 82 with the arms 24, 26 of the V-shaped member 22 generally parallel to the sides 84, 86 of the rectangular hole 82 having the widened central sections. The V-shaped member 22 is compressed slightly and inserted into the panel 80 by inserting the base of the V into the panel 80 until the notched section at the neck 30 is reached. A ledge 36 on the integral cap section 32 prevents the catch 10 from entering the panel too deeply. The catch 10 is then further compressed and rotated ninety degrees about the notch section having the neck 30 of the catch 10 such that the first arm 24 and the second arm 26 of the V-shaped member 22 are now perpendicular to the sides of the hole 80 having the curved out central section 84, 86. The V-shape member 22 then uncompresses such that V-shaped member 22 is snugly seated in the notches at the neck 30 on the panel 80. As can be seen in FIG. 5, the catch 10 is thus securely attached to the panel 80.

The one-piece catch 10 further includes a pawl 50 extending off the second arm 26 of the V-shaped member 22. The pawl 50 has a pawl surface 52 extending generally parallel to the panel 80 on which the one-piece catch 10 is mounted, and a head section 54 having a camming surface 56 adapted to contact the handle 100 as the handle 100 is folded to the folded position, as will be described in detail below.

Figure 6:
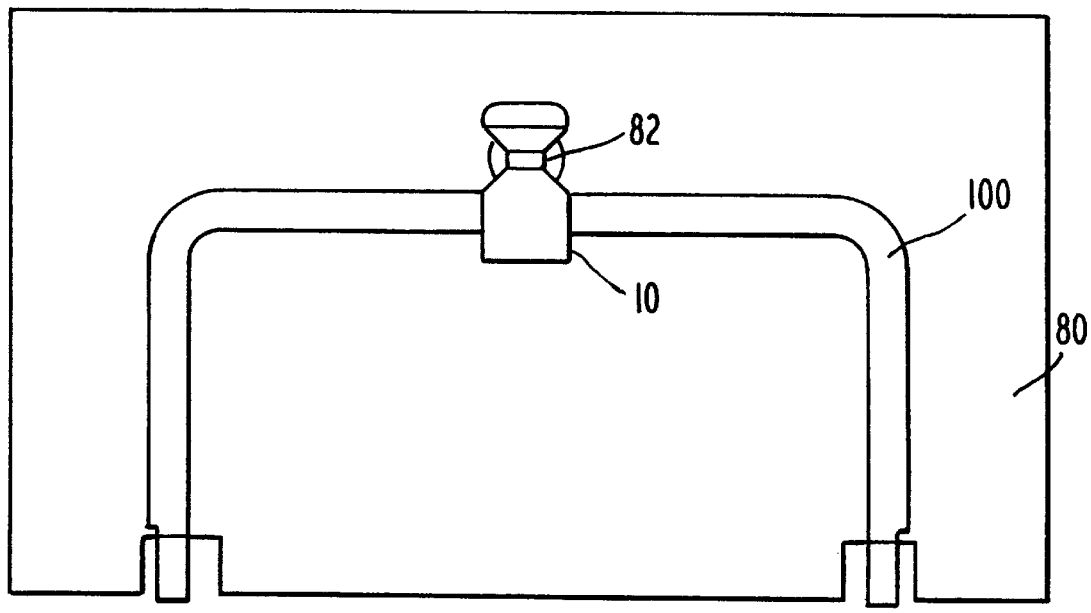
FIG. 6 is a top view of the one piece catch of FIG. 1 depicted on panel showing a U-shaped handle.
Figure 7:
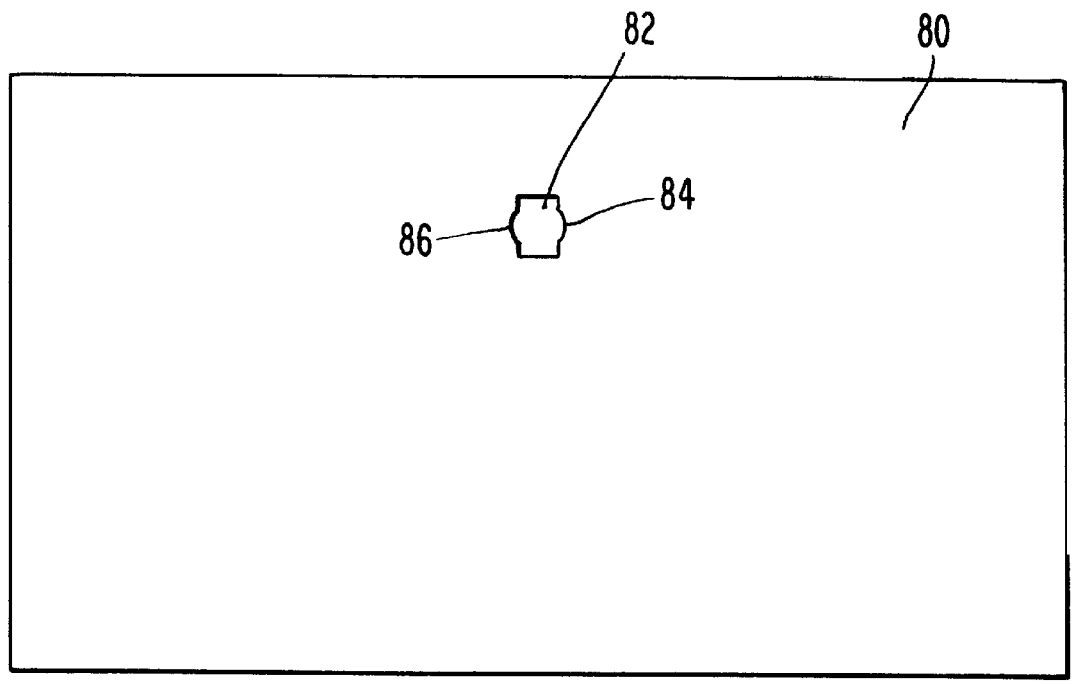
FIG. 7 is a top view of a typical hole in which the one-piece cat of FIG. 1 is mounted.

The one-piece catch 10 is mounted in spaced relation to the folding handle 100 such that the catch 10 is capable of holding the handle 100 securely in place when the handle 100 is in a folded position as shown in FIG. 5 and in top view in FIG. 6. As can be seen in FIG. 5, as the handle 100 rotates clockwise in the direction of arrow A, the top of the handle 100 comes in contact camming surface 56 of the one-piece catch 10 such that the pawl 50 moves to the right in the direction of arrow B thereby causing the second arm 26 of the V-shaped member 22 to compress towards the first arm 24 of the V-shaped member 22 in the direction of arrow C.

As the handle 100 continues to rotate in the clockwise direction, the top of the handle 100 reaches point D (see FIG. 5) of the camming surface 56 such that the pawl 50 snaps forward in the opposite direction to arrows B and C such that the handle 100 is firmly seated under pawl surface 52.

To release the handle 100 from the one-piece catch 10, the pawl 50 must be manually compressed by exerting a force on the pawl 50 at camming surface 56, again in the direction of arrow B while simultaneously rotating handle 100 in the counterclockwise direction, opposite to that of arrow A.

Preferably, the handle 100 is biased upwardly in some manner such that it is held securely against pawl surface 52. Alternatively, the handle 100 or one-piece catch 10 may be designed such that the handle 100 mates properly with the one-piece catch 10 because the handle 100 has reached its limit of travel to securely sit under pawl surface 52 of the catch 10. A moment exerted on handle 100 by ramped surface 55 preferably occurs in Direction A shown in FIG. 5., when the handle is in a folded, latched position, to aid in holding the handle in place.

Figure 8:
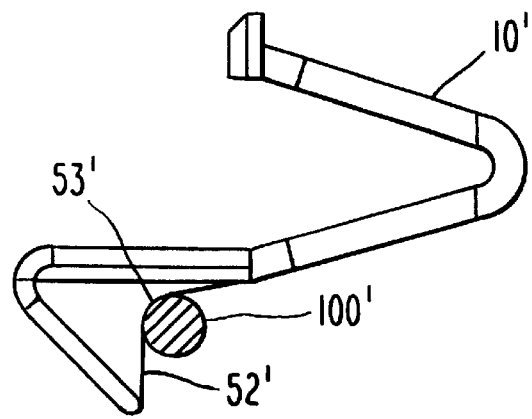
FIG. 8 is a side view of an alternate embodiment of a one-piece catch in accordance with the present invention in which the pawl section of the catch is radiused rather than angled.

Pawl surface 52 is preferably constructed having two angled surfaces 53, 55 such that numerous diameter handles 100 may be used with a single one-piece catch design, as depicted in FIG. 2. See also FIG. 5. However, as can be seen in FIG. 8, pawl surface 52' of alternate embodiment of the one-piece catch 10' may alternatively have a radius 53' matched to the radius of the cross section of the handle 100'. Here, the pawl surface 52' may also have a larger radius than the cross-sectional radius of the cross section of the handle 100'.

Figure 12:
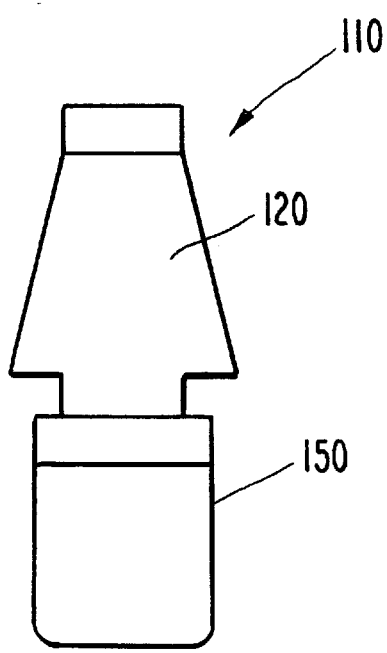
FIG. 12 is a front view of the one-piece catch of FIG. 9.
Figure 9:
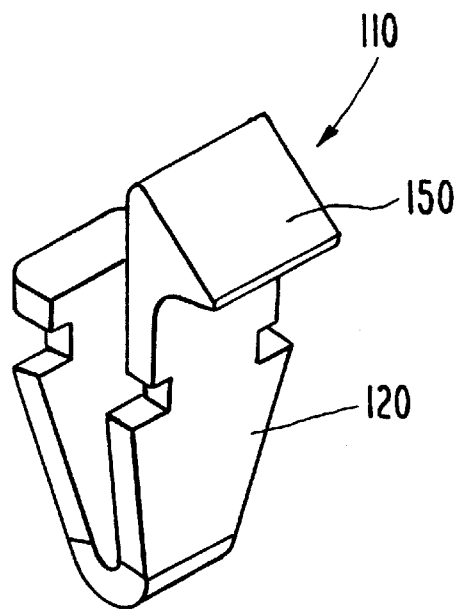
FIG. 9 is a perspective view of a one-piece catch in accordance with a second embodiment of the present invention.
Figure 11:
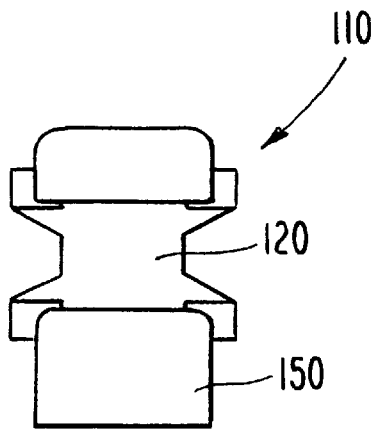
FIG. 11 is a top view of the one-piece catch of FIG. 9.

In a second embodiment of the present invention, as can be seen in FIGS. 9–12, a one-piece catch 110 with an alternate panel attachment means 120 is shown in which the one-piece catch 110 is installed from the rear side of the panel, i.e. opposite the side of the panel where the article resides, rather than the front side of the panel, as in the first embodiment. Here, the releasable pawl 150 of the second embodiment preferably has substantially straight sides, as can be seen in FIG. 12, such that the pawl 150 can be inserted through the rear if the panel.

As in the first embodiment, the one-piece catch 110 of the second embodiment is installed in a similarly shaped hole as depicted in FIG. 7. The one-piece catch 110 is compressed slightly, then inserted pawl end first from the rear of the panel into hole 82. The one piece catch 110 is then rotated ninety degrees in a similar manner to that of the first embodiment such that the one-piece catch properly seats in the hole 82.

Figure 10:
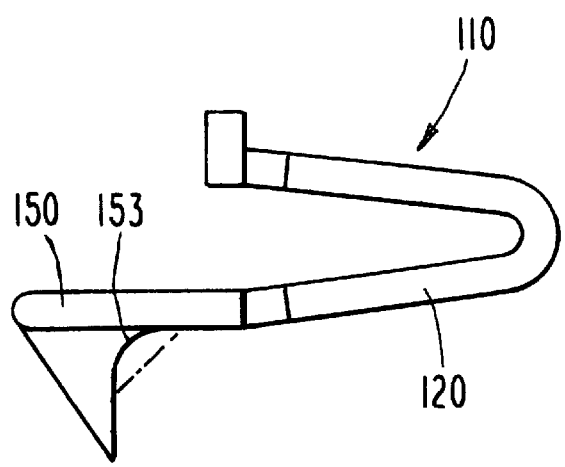
FIG. 10 is a side view of the one-piece catch of FIG. 9.

As in the first embodiment, the catch may have either a angles surfaces similar to that of 53, 55 as depicted in FIG. 10 in dotted line or a radius 153 similar to that of 53' of the first embodiment.

The present embodiments of the one-piece catch may also serve functions other than holding a handle in place. The catch of the present invention may also be used anywhere it is desirable to use a catch to hold any suitable article in place, anywhere a similar catch is typically used, that has the easy installation and reliability of the present invention.

It will be recognized by those skilled in the art that changes may be made in the above described embodiments of the invention without departing from the broad inventive concepts thereof. It is understood, therefore, that this invention is not limited to the particular embodiments disclosed, but is intended to cover all modifications which are within the scope and spirit of the invention as defined by the appended claims.

We claim:

1. A one-piece catch for installation on a panel having a front side and a rear side, for holding an article in place, comprising:

a) a panel attachment means for installing the one-piece catch on the panel by inserting the one-piece catch partially through the panel and rotating the one-piece catch generally ninety degrees to seat the one-piece catch in position, and b) a releasable pawl formed integral to the panel attachment means having a head section with a camming surface adapted to contact the article, the article moving the pawl back to force the pawl away from the article as the article is latched to the one-piece catch, the pawl springing forward as the article passes over the camming surface to seat the article under the pawl, the article releasable from the pawl by the application of pressure to the pawl away from the article.

2. The one-piece catch of claim 1, wherein the panel attachment means inserts through the front side of the panel.

3. The one-piece catch of claim 1, wherein the panel attachment means inserts through the rear side of the panel.

4. A one-piece catch for installation on a panel having a front side and a rear side, for holding a folding handle in a folded position to the front side of the panel, comprising:

a) a panel attachment means for installing the one-piece catch on the panel by inserting the one-piece catch partially through the panel and rotating the one-piece catch generally ninety degrees to seat the one-piece catch in position, and b) a releasable pawl formed integral to the panel attachment means having a head section with a camming surface adapted to contact the handle as the handle is folded to the folded position, the handle moving the pawl back to force the pawl away from the handle as the handle is latched to the one-piece catch, the pawl springing forward as the handle passes over the camming surface to seat the handle under the pawl, the handle releasable from the pawl by the application of pressure to the pawl away from the handle.

5. The one-piece catch of claim 4, wherein the panel attachment means inserts through the front side of the panel.

6. The one-piece catch of claim 4, wherein the panel attachment means inserts through the rear side of the panel.

7. The one-piece catch of claim 4, wherein the folding handle is biased to urge the handle to rotate toward the upright position when the handle is in the folded position.

8. The one-piece catch of claim 4, wherein the pawl surface is curved and has a radius that is substantially identical to a radius of the handle such that the handle is held firmly within the catch.

9. The one-piece catch of claim 4, wherein the pawl has two planar surfaces to fit handles having various cross-sectional shapes and radii.

10. A one-piece catch for installation on a panel having a front side and a rear side, for holding an article to the front side of the panel, comprising:

a) a panel attachment means for installing the one-piece catch on the panel by inserting the one-piece catch partially through the panel and rotating the one-piece catch generally ninety degrees to seat the one-piece catch in position, comprising:

i) a resilient, generally V-shaped member having a first arm of the V-shape and a second arm of the V-shape meeting at the bottom of the V-shaped member, said first and second arms capable of being compressed towards one another, ii) a notched section on each of the first and second arms of the V-shaped member for mating with the panel, iii) wherein the one-piece catch has means by which the bottom of the V-shaped member is insertable through a hole in the panel and rotatable ninety degrees when the first and second arms are compressed towards one another to seat the one-piece catch in position at the notched sections the V-shaped member on the panel, and b) a releasable pawl formed on one resilient arm of the V-shaped member comprising a pawl surface extending generally parallel to the panel on which the one-piece catch is mounted, and a head section having a camming surface adapted to contact the article to compress the arms of V-shaped member, the handle moving the pawl back compressing the arms of the V-shaped member together, to force the pawl away from the article as the article is latched to the one-piece catch, the pawl springing forward as the article passes over the camming surface to seat the article under the pawl surface, the article releasable from the pawl by the application of pressure to the pawl away from the article.

11. The one-piece catch of claim 10, wherein the article is a folding handle.

12. The one-piece catch of claim 11, wherein the folding handle is biased to urge the handle to rotate toward the upright position when the handle is in the folded position.

13. The one-piece catch of claim 11, wherein the pawl surface is curved and has a radius that is substantially identical to a radius of the handle such that the handle is held firmly within the catch.

14. The one-piece catch of claim 11, wherein the pawl surface has two planar surfaces to fit handles having various cross-sectional shapes and radii.

15. A one-piece catch for installation on a panel having a front side and a rear side, for holding an article to the front side of the panel, comprising:

a) a panel attachment means for installing the one-piece catch on the panel by inserting the one-piece catch partially through the panel and rotating the one-piece catch generally ninety degrees to seat the one-piece catch in position, comprising:

i) a resilient, generally V-shaped member, having an upper end and a lower end, having a first arm of the V-shape and a second arm of the V-shape meeting at the bottom of the V-shaped member, said first and second arms capable of being compressed towards one another, ii) a notched section on each of the first and second arms of the V-shaped member for mating with the panel, iii) wherein the one-piece catch has means by which the upper end of the V-shaped member is insertable through a hole in the panel and rotatable ninety degrees when the first and second arms are compressed towards one another to seat the one-piece catch in position at the notched sections the V-shaped member on the panel, and b) a releasable pawl formed on one resilient arm of the V-shaped member comprising a pawl surface extending generally parallel to the panel on which the one-piece catch is mounted, and a head section having a camming surface adapted to contact the article to compress the arms of V-shaped member, the handle moving the pawl back compressing the arms of the V-shaped member together, to force the pawl away from the article as the article is latched to the one-piece catch, the pawl springing forward as the article passes over the camming surface to seat the article under the pawl surface, the article releasable from the pawl by the application of pressure to the pawl away from the article.

16. The one-piece catch of claim 15, wherein the article is a folding handle.

17. The one-piece catch of claim 15, wherein the folding handle is biased to urge the handle to rotate toward the upright position when the handle is in the folded position.

18. The one-piece catch of claim 15, wherein the pawl surface is curved and has a radius that is substantially identical to a radius of the handle such that the handle is held firmly within the catch.

19. The one-piece catch of claim 15, wherein the pawl surface has two planar surfaces to fit handles having various cross-sectional shapes and radii.

* * * * *